(12) United States Patent
Dahi Taleghani et al.

(10) Patent No.: US 10,954,767 B2
(45) Date of Patent: Mar. 23, 2021

(54) METHODS FOR TEMPORARY FRACTURE ISOLATION

(71) Applicant: BOARD OF SUPERVISORS OF LOUISIANA STATE UNIVERSITY AND AGRICULTURAL AND MECHANICAL COLLEGE, Baton Rouge, LA (US)

(72) Inventors: Arash Dahi Taleghani, Boalsburg, PA (US); Guoqiang Li, Baton Rouge, LA (US)

(73) Assignee: BOARD OF SUPERVISORS OF LOUISIANA STATE UNIVERSITY, Baton Rouge, LA (US)

( * ) Notice: Subject to any disclaimer, the term of this patent is extended or adjusted under 35 U.S.C. 154(b) by 65 days.

(21) Appl. No.: 16/040,879

(22) Filed: Jul. 20, 2018

(65) Prior Publication Data

US 2019/0024490 A1    Jan. 24, 2019

Related U.S. Application Data

(60) Provisional application No. 62/535,468, filed on Jul. 21, 2017.

(51) Int. Cl.
| | | |
|---|---|---|
| *E21B 43/26* | (2006.01) | |
| *E21B 33/138* | (2006.01) | |
| *C09K 8/508* | (2006.01) | |
| *C09K 8/516* | (2006.01) | |
| *C09K 8/42* | (2006.01) | |

(52) U.S. Cl.
CPC ............. *E21B 43/26* (2013.01); *C09K 8/508* (2013.01); *C09K 8/516* (2013.01); *E21B 33/138* (2013.01); *C09K 8/426* (2013.01); *C09K 2208/08* (2013.01)

(58) Field of Classification Search
CPC ........ E21B 43/26; E21B 33/138; C09K 8/426
USPC ....................................................... 166/288
See application file for complete search history.

(56) References Cited

U.S. PATENT DOCUMENTS

| | | | |
|---|---|---|---|
| 2,122,452 A | 7/1938 | Clason | |
| 8,714,241 B2* | 5/2014 | Joseph | E21B 33/1208 166/179 |
| 2011/0127042 A1* | 6/2011 | Ocalan | E21B 33/138 166/373 |
| 2013/0062061 A1* | 3/2013 | Taylor | E03B 3/18 166/288 |

(Continued)

OTHER PUBLICATIONS

Allison, Dave, Shawn Curry and Brad Todd, Restimulation of Wells using Biodegradable Particulates as Temporary Diverting Agents, Canadian Society for Unconventional Gas (CSUG), 2011, p. 1-11, CSUG/SPE 149221.

(Continued)

*Primary Examiner* — Zakiya W Bates
*Assistant Examiner* — Ashish K Varma
(74) *Attorney, Agent, or Firm* — Thomas|Horstemeyer, LLP (57) ABSTRACT

Methods for temporary fracture isolation are provided. An existing fracture is treated with a chemical diverter. The chemical diverter is exposed to conditions causing it to expand, plugging the fracture. A new fracture can be created through the application of pressure and fluid, without disrupting the plugged fracture. The chemical diverter can then be removed through biodegradation or the application of a solvent to reopen the first fracture.

18 Claims, 6 Drawing Sheets

(56) References Cited

U.S. PATENT DOCUMENTS

2016/0312112 A1* 10/2016 Ogle ................. E21B 43/26

OTHER PUBLICATIONS

Arnold, David and Francisco Fragachan, Eco-friendly Degradable Mechanical Diverting Agents for Combining Multiple-Staged Vertical Wells: Case History from Wasatch Formation, Society of Petroleum Engineers (SPE), 2014, p. 1-7, SPE-171707-MS.

Asala, H.I., M. Ahamdi and A. Dahi Taleghani, Why Re-fracturing Works and Under What Conditions, Society of Petroluem Engineers (SPE), 2016, p. 1-28, SPE-181516-MS.

Davis, N., P. Mihalik, P. R. Lundie, Fred Growcock, G. Calloni and E. Davidson, New Permeability Plugging Apparatus Procedure Addresses Safety Technology Issues, Society of Petroleum Engineers (SPE) and International Association of Drilling Contractors (IADC), 1999, p. 1-6, SPE/IADC52815.

Glasbergen, G., B. Todd, M. Van Domelen, Halliburton and M. Glover, Design and Filed Testing of a Truly Novel Diverting Agent, Society of Petroleum Engineers (SPE), 2006, p. 1-20, SPE 102606.

Gomaa, Ahmed M., Andrea Nino-Penaloza, Elizabeth McCartney, John Mayor and Baker Hughes, Engineering Solid Particulate Diverter to Control Fracture Complexity: Experimental Study, 2016, p. 1-19, SPE-179144-MS.

Gomaa, Ahmed M., Hong Sun, Scott Nelson, Qi Qu (Solvay), Go Virgillo Boncan and Baker Hughes, Using Swelling Materials to Control Fracture Complexity: Experimental Study, 2015, p. 1-15, SPE-174783-MS.

Harrison, N. W, Diverting Agents-History and Application, Journal of Petroleum Technology, May 1972, p. 593-598.

Kalita, Hemjyoti, Manabendra Mandal and Niranjan Karak, Biodegradable solvent-induced shape-memory hyperbranched polyurethane, Springer Science+Business Media B.V., 2012, p. 1-8, J Polym Res 19:9982.

Kloss, Christoph, Christoph Goniva, Alice Hager, Stefan Amberger and Stefan Pirker, Models, algorithms and validation for opensource DEM and CFD-DEM, Progress in Computational Fluid Dynamics, 2012, p. 140-152, vol. 12, Nos. 2/3.

Lendlein, Andreas and Robert Langer, Biodegradable, Elastic Shape-Memory Polymers for Potential Biomedical Applications, Science Magazine, May 31, 2002, p. 1673-1676, vol. 296.

Mansour, Ahmed Khaled, Arash Dahi Taleghani and Guoqiang Li, Smart Expandable LCMs—A Theoretical and Experimental Study, American Association of Drilling Engineers (AADE), 2017, p. 1-7, AADE-17-NTCE-074.

Santos, L. A. Dahl Taleghani and G. Li, Smart Expandable Proppants to Achieve Sustainable Hydraulic Fracturing Treatments, Society of Petroleum Engineers (SPE), 2016, p. 1-14, SPE-181391-MS.

Taleghani, A. Dahi, G. Li and M. Moayeri, The Use of Temperature-Triggered Polymers to Seal Cement Voids and Fractures in Wells, Society of Petroleum Engineers (SPE), 2016, p. 1-15, SPE-181384-MS.

Zhu, H.P., Z.Y. Zhou, R.Y. Yang and A.B. Yu, Discrete particle simulation of particulate systems: Theoretical developments, Chemical Engineering Science, Mar. 23, 2007, p. 3378-3396, vol. 62.

* cited by examiner

METHODS FOR TEMPORARY FRACTURE ISOLATION

CROSS-REFERENCE TO RELATED APPLICATIONS

This application claims the benefit of and priority to U.S. Provisional Application Ser. No. 62/535,468, having the title "METHODS FOR TEMPORARY FRACTURE ISOLATION", filed on Jul. 21, 2017, the disclosure of which is incorporated herein by reference in its entirety.

BACKGROUND

Refracturing operations have the potential to extend the production time in unconventional reservoirs with minimum capital investment. These reservoirs are known for having steep decline rates. If there is a considerably small stimulated rock volume (SRV) around the well and the reservoir still has a potential to produce hydrocarbons, these wells can be re-stimulated through refracturing. Re-stimulation is considerably less costly in comparison to drilling and completing a new well. Refracturing can increase the production rate for 2-3 times with a small capital cost. Production can reach unacceptable rates in cases where proppant was unevenly placed, poorly distributed or the perforation showed low efficiency, which justifies refracturing (Asala et al., 2016). Also improved reservoir knowledge or changes in reservoir stress are other reasons to apply this technique. A recent study by Upstream Pumping (2016) showed that an operator was able to increase the production by 208% after refracturing the well and slowed the production decline compared to initial production in the Williston Basin in North Dakota.

In order to perform an effective refracturing operation, the old fractures have to be isolated so that the excessive pressure from the fracking fluid can be diverted into creating new fractures. Sometimes, even during the primary fracturing jobs, temporary fracture isolation is considered to increase fracture complexity and drainage area. The fracture clogging process may be considered before pumping hesitation or simply during continuous pumping operations. Diverting agents or simply diverters are used to achieve isolation by plugging wide pre-existing fractures. These diverters are chemical agents, solid fine-grain particles that can temporarily plug the fracture. After the treatment, the diverters degrade and production can be resumed from the old fractures as well. This approach is much simpler and more effective than mechanical isolation devices like packers, as it does not require well intervention or costly equipment like coil tubing, for instance. Another advantage is that the fluid diversion occurs inside the reservoir, not in the perforations, allowing the creation of a complex network of fractures.

During a refracturing treatment, the particulate diverters are usually pumped between the treatment stages, sealing the previous fractures and diverting the fluid into unstimulated parts of the formation. The selection of the most appropriate type of diverter depends on several factors, including perforation density, the fracturing fluid composition, formation fluid to be produced, average treatment temperature, bottomhole static temperature (BHST) and the differential pressure to be applied on the diverter pack (Glasbergen et al., 2013). Particle size should be adapted to the formation layer with the highest permeability, preventing invasion on the porous medium by the diverters. For near wellbore diversion, with fractures wider than 0.2 in., only large particles can bridge the fracture; while for far-field diversion, with smaller fracture width, large particles are not required (Gomaa et al., 2016).

A wide range of materials have been used as diverters in the industry. Clason (1936) was the first to describe particulate diverters. He basically used water-insoluble and oil-soluble calcium salt of a fatty acid to plug fractures and treat separated formations with acids. Harrison (1972) detailed the application of mechanical and chemical diverters such as ball sealers, benzoic acid flakes, rock salt, naphthalene and oyster shells, widely used in vertical wells. These materials have disadvantages like the need for a secondary treatment for removal, requiring long operational time and early settlement, and not penetrating deep inside the fracture. The use of biodegradable material provided many benefits in the operation but the material has to be evaluated with care. It can degrade at temperatures lower than the ones associated with downhole conditions in oil and gas reservoirs. New diverters have been extensively tested on the field, presenting the pressure response from the treatments in each stage (Allison et al., 2011; Arnold et al., 2014). Recent publications investigated, through laboratory experiments, the efficacy of new and novel biodegradable materials as diverters (Allison et al., 2011; Gomaa et al., 2015). They also compared the performance, cost and other characteristics with the traditional diverters. Some diverters mentioned in these works fail to resist high pressure and high temperature conditions.

SUMMARY

The present disclosure provides for methods for temporary fracture isolation such as for wells and reservoirs.

A method includes providing a chemical diverter to a first fracture, wherein the chemical diverter is a shape memory polymer, causing, in a predetermined manner, the shape memory polymer to increase in dimension at a particular location in the first fracture, plugging the first fracture with the shape memory polymer; and applying pressure and fluid via a pump to the fracture to create one or more new fracture.

Another method for temporary fracture isolation includes providing a shape memory polymer to a first fracture, wherein the shape memory polymer comprises a plurality of particle sizes, causing, in a predetermined manner, the shape memory polymer to increase in dimension at a particular location in the first fracture, plugging the first fracture with the shape memory polymer, applying pressure and fluid via a pump to the fracture to create at least one new fracture; and introducing a solvent to dissolve the shape memory polymer to reopen the first fracture.

BRIEF DESCRIPTION OF THE DRAWINGS

Further aspects of the present disclosure will be more readily appreciated upon review of the detailed description of its various embodiments, described below, when taken in conjunction with the accompanying drawings. The components in the drawings are not necessarily to scale, emphasis instead being placed upon clearly illustrating the principles of the present disclosure.

FIG. 7 (top) shows particles expanding and plugging the single fracture. FIG. 7 (bottom) provides an example zoomed-in image of the diverters as they expand.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art.

The following examples are put forth so as to provide those of ordinary skill in the art with a complete disclosure and description of how to perform the methods and use the shape memory polymers disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

General Discussion

In various embodiments, a chemical diverter is added to an existing fracture in a wellbore to temporarily plug the fracture, allowing for refracturing. In an embodiment, the method can include providing or disposing a chemical diverter (e.g., shape memory polymer) to a fracture and causing, in a predetermined manner (e.g., in a temperature range), the chemical diverter to increase in one or more dimensions (e.g. diameter) at a particular location in the fracture to plug or substantially plug the fracture. Subsequently, pressure and/or fluid is applied to the fracture to create at least one new fracture.

In an aspect, the chemical diverter is pumped into the existing fracture and expanded by surrounding geothermal heat, thereby plugging or substantially plugging the fracture. The phrase "substantially plug" or the equivalent refers to plugging the fracture enough so that pressure and/or fluid is applied to the wellbore to create at least one new fracture. Fracturing fluid can be pumped into the wellbore, creating new fractures without removing the expanded chemical diverter or opening the existing fractures. In various embodiments, the chemical diverter can be removed using chemical dissolution or biodegradation to reopen the existing fractures. In various embodiments, the chemical diverter is a shape memory polymer.

In an embodiment, the shape memory polymer has a starting state, a programmed state, and an activated state. A more detailed description of the states and conversion of the states are provided below and in the Example in reference to making the shape memory polymer. In the starting state, the shape memory polymer has a starting diameter. In the programmed state, the shape memory polymer has a program state diameter. In the activated state, the shape memory polymer has an activated state diameter. In an embodiment, the starting state has a diameter greater than the programmed state, while the programmed state has a diameter that is less than that of the activated state. In an embodiment, the starting diameter can be about 100 μm to 2 mm. In an embodiment, the programmed state diameter can be about 100 μm to 1 mm and the activated state diameter can be about 100 μm to 2 mm. In an embodiment, the shape memory polymer in the starting state is about 20 to 70% larger than the shape memory polymer in the programmed state. In an embodiment, the shape memory polymer in the activated state is about 2 to 50% larger than the shape memory polymer in the programmed state depending on the confining pressure and programming procedure.

If the shape memory polymer is not spherical in shape, one or more of the dimensions of the shape memory polymer (e.g., length, width) will increase in value upon conversion from the programmed state to the activated state. Use of the term "diameter" throughout the disclosure is done for convenience and clarity, and one or more of the dimensions for non-spherical shape memory polymer can correspond to the diameter dimension as used in the descriptions provided herein.

The shape memory polymer in the programmed state will convert to the shape memory polymer in the activated state when an activation condition is applied to the shape memory polymer in the programmed state. In an embodiment, the activation condition can be an activation temperature, a moisture, a light, a pH, a magnetic field, an ultrasonic wave, electricity current, and a combination thereof. In an embodiment, the activation temperature can be about 70° C. to 180° C., and is within or above the transition temperature of the polymer. The shape memory polymer in the programmed state can be exposed to the activation temperature in-situ in a well fracture, and as a result the width of the fracture can be maintained or increased as the diameter of the shape memory polymer increases to that of the shape memory polymer in the activated state.

In an embodiment, the shape memory polymer can be composed entirely of a shape memory polymer material or can have a coating layer of shape memory polymer material around a core. In embodiments in which the shape memory polymer is composed entirely of shape memory polymer material, the material particulates can be in form of spheres, discs, fibers, and the like. In an embodiment, the shape memory polymer not including a core can have a diameter of about 20 μm to 2 mm or about 100 μm to 2 mm when the shape memory polymer is in the starting state.

In an embodiment, the core can be a grain of sand, bauxite, ceramics, or other similar particle. In an embodiment, the core can have a diameter (or one or more of dimensions of a non-spherical core) of about 10 to 50 microns. In an embodiment, the layer of polymer can have a thickness of about 10 to 300 microns when the shape memory polymer is in the activated state. In an embodiment, the layer of polymer can have a thickness of about 5 to 200 microns when the shape memory polymer is in the programmed state. In an embodiment, the polymer is in the range of 25% to 99% by weight.

In an embodiment, the polymer can be a thermoplastic shape memory polymer. In an embodiment, the thermoplastic shape memory polymer can be selected for instance from organic thermoplastic polymer in the polyaryletherketone (PAEK) family (e.g., polyether ether ketone (PEEK)), polypropylene (PP), polystyrene, polyurethane, polynorbornene (e.g., polynorbornene units that are partially substituted by polyhedral oligosilsesquioxane (POSS)), polyester, polyether, polyethylene terephthalate (PET), polyethyleneoxide (PEO), poly(1,4-butadiene), poly(vinyl acetate), polyamide-6 (nylon-6), poly(tetrahydrofuran), poly(2-methyl-2-oxazoline), poly(ethylene adipate), MDI/1,4-butanediol, poly(ε-caprolactone), poly vinyl chloride, polyethylene/polyimide blend, and a combination thereof.

In an embodiment, the shape memory polymer can be a thermosetting shape memory polymer. In an embodiment, the thermosetting shape memory polymer can be selected for instance from an organic thermosetting polymer in the epoxy family (e.g. bisphenol A diglycidyl ether, bisphenol F, epoxidised novolacs, aliphatic epoxy resins, glycyylamin epoxy resin, and the like) or a phenolic family (e.g. Novolacs (formaldehyde/phenol<1), Resoles (formaldehyde/phenol>1), polyhydroxyphenols, and the like). They can also be a blend, a composite, or an interpenetration network of thermoplastic and thermosetting shape memory polymers.

In an embodiment, the shape memory polymer can be an ionic polymer or ionomer polymer. In an embodiment, the ionic or ionomer shape memory polymer can be e.g. poly (ethylene-co-methacrylic acid). They can also be a blend, a composite, or an interpenetration network of thermoplastic or thermosetting shape memory polymers, and ionic or ionomer shape memory polymers.

In an embodiment, the shape memory polymer can be included in a mixture including sand, bauxite, and/or ceramic and/or other types of shape memory polymers, where different types can have different dimensions, made of different polymers, be made of a solid polymer material, be of a core/shell design (e.g., polymer material layer around a core), combinations thereof, and the like.

In an embodiment, the shape memory polymer can be made by heating the shape memory polymer in the starting state to a programming temperature under a first pressure to form the shape memory polymer in the programmed state. Subsequently, the shape memory polymer in the programmed state is cooled under the first pressure to a cooling temperature (ambient temperature of about 0 to 40° C.), where the shape memory polymer remains in the programmed state after cooling. The programming temperature can be about the reservoir temperature. In other words, the programming temperature is greater than the transition temperature of the polymer, and since the molecular chains of the polymer are flexible, the polymer compresses under the first pressure. During the cooling process under the first pressure, the molecular chains of the polymer lock into place, so that when the first pressure is released, the shape memory polymer stays in the programmed state. Heating the shape memory polymer in the programmed state above the transition temperature of the polymer allows the locked molecular chains to release and convert to the activated state having a greater diameter, or with the same diameter but releasing stress to support the fracture opening.

In an embodiment, the shape memory polymer can be used to plug fractures so that new fractures can be created. Once the shape memory polymer in the programmed state is positioned in the fracture, the shape memory polymer can be subject to the activation condition (e.g., activation temperature). For example, the temperature can increase by injecting material having a higher temperature and/or through heating from the surrounding material. Upon exposure to the activation temperature, the shape memory polymer in the programmed state is converted to the shape memory polymer in the activated state, where the diameter of the shape memory polymer in the activated state has a diameter that is greater than the diameter of the shape memory polymer in the programmed state. In this way, the shape memory polymer can be used to plug or substantially plug the fracture so that fracturing fluid can be used to open new fractures.

In an embodiment, shape memory polymer particles of more than one size can be included (also referred to as non-uniform particle size), wherein particles having different shapes or diameters are used in conjunction with one another to plug a fracture. Non-uniform size of particles can make fracture plugging faster. By including shape memory non-uniform distribution, such as bi-normal or multi-normal particle sizes, more effective plugging can be obtained. The size and distribution of the shape memory polymer particles can be optimized based on the parameters of a particular fracture.

Once the fracture is plugged or substantially plugged, the shape memory polymer can be removed by chemical dissolution and/or biodegradation. In an embodiment, the chemical dissolution can occur by the addition of a solvent including HCl, HF, ionic liquids, ethylene glycol, diethylene glycol, cyclohexanol, N-methyl-2-pyrrolidone, etc., or a combination thereof. In an embodiment, the biodegradation may also occur by using known approaches such as polyurethane by *P. aeruginosa* strain MTCC 7814 bacteria, Poly($\varepsilon$-caprolactone) by hydrolytic degradation, and the like.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

In the present disclosure, a new type of diverters made of shape memory polymers (SMP) are introduced that can expand upon reaching a triggering temperature in the formation to effectively plug off the main initial fracture. The SMP's expansion is triggered by the in-situ heat of the formation. Through laboratory experiments, the bridging efficiency of this material was verified. Furthermore, a coupled CFD-DEM model was developed to simulate the diverter transport, placement and expansion within the fracture in the subsurface conditions. The numerical model also demonstrated steep pressure build up, which can be interpreted as fracture plugging.

The use of chemical diverters in refracturing operations has been increasing and taking the place of mechanical diverters, which were a prevailing technique for years. Chemical diverters consist of particles or liquid that can temporarily clog pre-existing fractures, allowing diversion of the fracturing fluid to create new fractures inside the reservoir and generate a more complex fracture network. The success or failure of a re-stimulation treatment largely depends on the diverter placement and effective isolation of previous fractures. The present disclosure includes a novel class of materials that can be used as a diverting agent, which after pumping into the formation expands to temporarily plug the existing fractures and allow the fracture energy to concentrate on generating new fracture strands. Biodegradation and chemical dissolution can be utilized at the end of the treatment to resume the flow from isolated fractures.

Proof-of-concept experiments were carried out using a particle-plugging apparatus to demonstrate the bridging ability of the expandable diverter. The fracture sealing process is observed with the steep increase in the fluid pressure. In order to further tune the performance of this diverter and simulate its performance in reservoir conditions, a numerical model was developed to simulate its placement and expansion. The coupled computational fluid dynamics-discrete element method approach can track the diverting particles individually and simulate de-frac fluid flow within the fractures. Multiple scenarios were tested, with different particle sizes and networks of fractures.

Shape Memory Polymers

Shape memory polymers (SMPs) are a type of polymeric material capable of storing a prescribed shape indefinitely and recover the original shape by specific external trigger, e.g. heat, electrical current, moisture, light, or pH. When heated to a glass transition temperature ($T_g$), thermoset polymers transform from a rigid, glassy state to a rubber, elastic state. Thermoset polymers have the advantage of resisting higher temperatures and higher mechanical deformation when compared to thermoplastic polymers due to its crosslinked structure. There are several classes of smart materials with the shape memory effect, along with shape memory ceramics and shape memory alloys, but SMPs have the advantage of being cheap, easier to process, nontoxic, biodegradable and can achieve much higher degrees of deformation (Li, 2014). In a recent study by Dahi Taleghani et al. (2016), SMP particles were used as an expansive cement additive to seal cement voids and fractures in the well annulus. Mansour et al. (2017) applied SMP particles as lost circulation materials to seal fractures during drilling operations. SMPs were also tested as expandable proppants, enhancing the fracture conductivity after a stimulation treatment (Santos et al., 2016). The SMPs used can degrade by the use of secondary agent such as nitric acid or sulphuric or in high temperature environments like the reservoir environment. Different SMP materials have already found applications in medical devices. Recently, biodegradable SMPs started to be used as medical implants (Lendlein and Langerz, 2002), the material degrades into substances and can be eliminated by the body after the tissue has regenerated.

SMPs need to be programmed to change into the temporary shape and return to the original shape. The classical programming method is presented in FIG. 1, and it is a four step thermomechanical cycle, involving changes in temperature (T), stress ($\sigma$) and strain ($\varepsilon$). Step 1 is pre-stressing (above $T_g$); step 2 is holding the strain and cool down; step 3 is removal of the load and fixing the shape below $T_g$; step 4 is heating above $T_g$ and shape recovery (Li, 2014).

Figure 1:
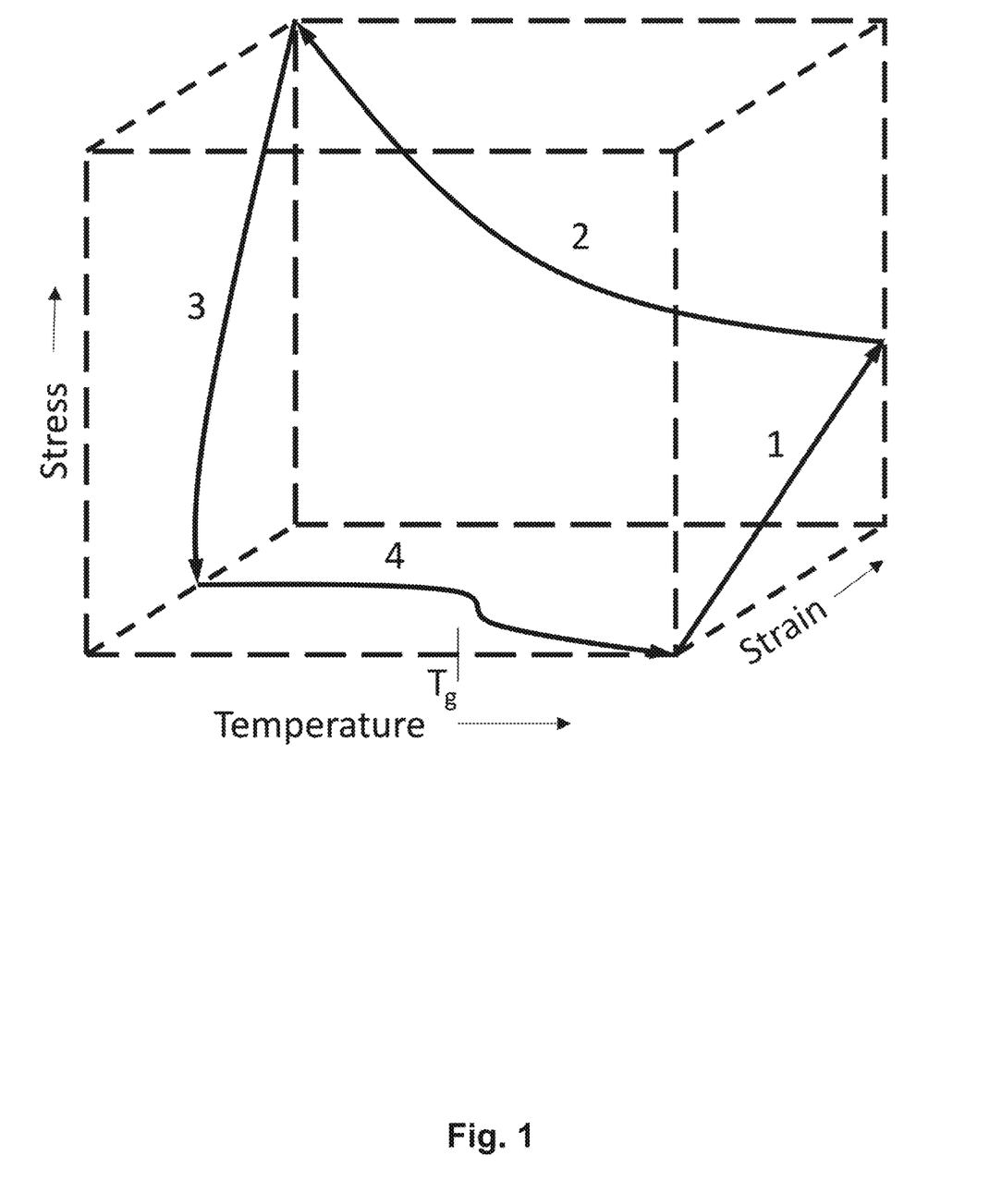
FIG. 1 illustrates the main steps of the classical thermomechanical cycle for shape memory polymers (SMP).

The process starts at temperatures above $T_g$, applying a high strain deformation (pre-deformation, or pre-strain). Then it is followed by maintaining the pre-strain while cooling down below $T_g$. The third step is the removal of the stress in the glassy state. This completes the programming. After that, reheating the SMP to its initial temperature without applying constraint, brings the pre-strain back to zero (unconstrained recovery) and recovers the initial shape.

Experimental Method

Figure 2A:
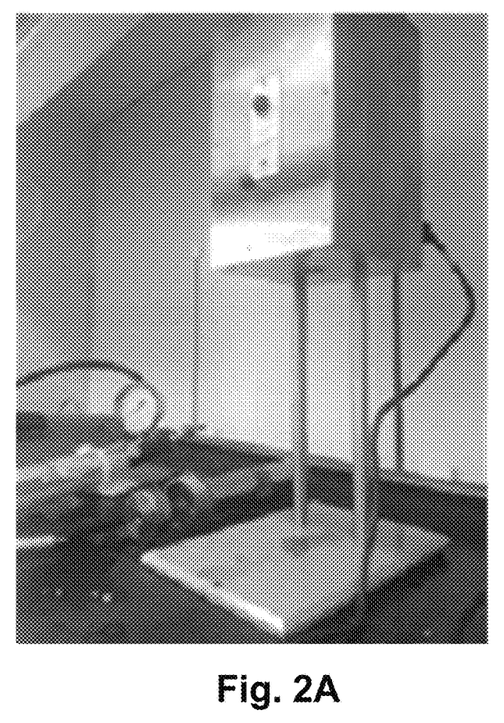
FIGS. 2A-B show an article plugging apparatus (FIG. 2A) used to determine the ability of the diverters to plug the fracture and a tapered disc (FIG. 2B), simulating a fracture.
Figure 2B:
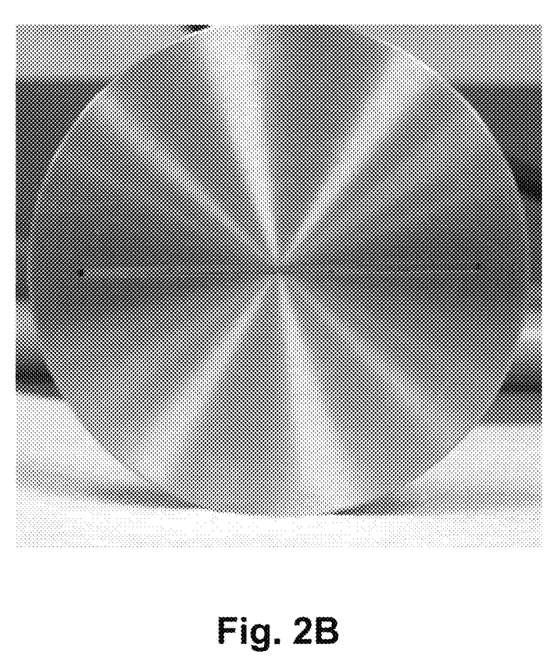

American Petroleum Institute (API) does not yet have any published standard practice to test diverting agents. In the present disclosure, the bridging ability of the expandable diverter was measured experimentally using a permeability plugging apparatus (PPA), originally designed to evaluate sealing capability of drilling loss circulation materials. The apparatus was chosen to show the applicability of the proposed refracturing material due to its similarity with the governing physics in fracture plugging. In the equipment, pressure is applied from below and forces the fluid through a small aperture (fracture). The PPA can perform under high pressure and high temperatures, similar to the conditions encountered in the reservoirs where the fractures are located. Davis et al. (2000) described the procedures and characteristics of the apparatus. Slot discs and tapered discs represent the fracture, with 0.1 and 0.04 in in width, respectively. FIGS. 2A-B show the apparatus and the tapered disc used in one of the measurements. The main steps to verify the bridging ability of the diverter are: preheating the cell to 75° C., simulating reservoir temperature; loading the fluid cell with slickwater and diverting agents; transferring the pressure to the fluid with a hydraulic pump; and verifying pressure buildup and fluid loss.

Figure 3:
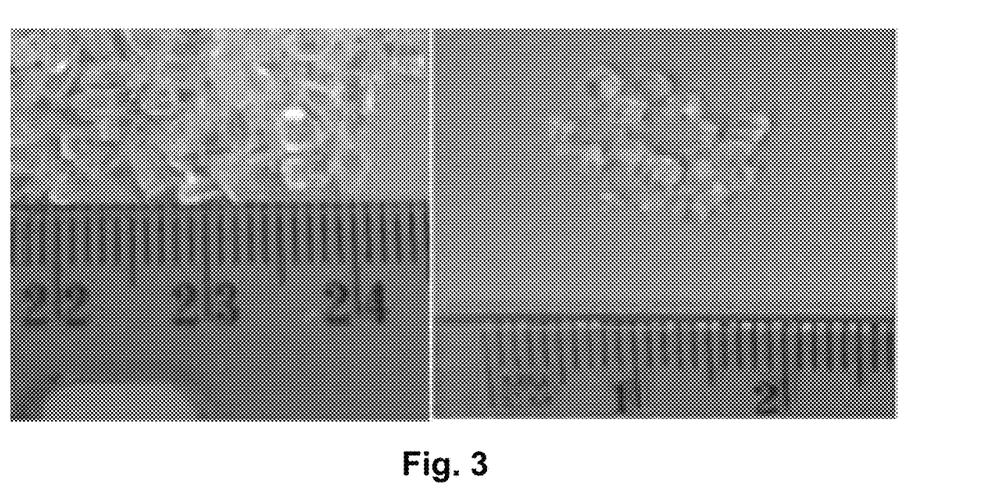
FIG. 3 shows particles before (left) and after (right) expansion.

The particles are programmed to expand 10% at 75° C. Their programmed shape is flat (FIG. 3, left), similar to discs. After expanding they are substantially spherical (FIG. 3, right).

Numerical Method

To simulate the complete process of diverter transport, placement, expansion and degradation and predict its performance in future field applications, we developed a numerical model to simulate fracture plugging. The model is able to reproduce particle expansion due to heat transfer from the formation and fluid particle interactions such as the drag force. The open source package CFDEM was used for the simulations. The software is thoroughly described by Kloss et al., (2012). Diverting particles use the discrete element methods (DEM), modeled as Lagrangian points containing several properties such as diameter, position and contact angle, while the fracturing fluid follows the continuous computational fluid dynamics (CFD) based on local averaged Navier-Stokes equations. The flow starts at the wellbore and is assumed to be initially in only one direction. This model can track the diverting particles individually and simulate the frac fluid flow within the fractures. Coupling of both models is calculated in time steps. For each time step, the position and velocities of the solid particles are given by DEM, and then the information is evaluated for porosity and drag force data in a computational cell. CFD can obtain the fluid flow from these data and incorporate the fluid drag forces in the individual particles, which will lead DEM to calculate the motion of the particles for the next time step (Zhu et al., 2007). This process follows Newton's third law of motion.

In DEM, the governing equations for translational and rotational movement of the particles are used as deformable three-dimensional objects required by Newton's second law of motion:

$$m_i \frac{dv_i}{dt} = F_{i,n} + F_{i,t} + F_{i,f} + F_{i,g} \quad (1)$$

$$I_i = \frac{d\omega_i}{dt} = r_{i,c} \times F_{i,t} + T_{i,r} \quad (2)$$

where $F_{i,n}$ denotes the normal particle-particle contact force, $F_{i,t}$ is the tangential particle-particle contact force, $F_{i,f}$ is particle-fluid interaction and $F_{i,g}$ is the gravitational force. $T_{i,r}$ is the torque acting on the particle. The Hertz-Mindlin model contact is used in the particles' interactions and they expand by thermal expansion. Navier-Stokes are the governing equations of CFD. It is based on the conservation law of physical properties of the fluid.

$$\frac{\partial \varepsilon_f}{\partial t} + \nabla \cdot (\varepsilon_f u_f) = 0 \quad (3)$$

$$\frac{\partial (\varepsilon_f u_f)}{\partial t} + \nabla \cdot (\varepsilon_f u_f u_f) = \varepsilon_f \nabla \frac{p}{\rho_f} - R_{pf} + \nabla \cdot \tau, \quad (4)$$

where $u_f$ and p are, respectively, the fluid velocity and pressure; $\tau$, $\varepsilon_f$ and $R_{pf}$ are the fluid viscous stress tensor, volume fraction occupied by the fluid and momentum exchange with the particulate phase, which depends on the drag force. The particle and fluid properties used for the simulation are listed in the table below. Three sizes of diverters were tested, coarse, medium and fine (mesh size 20, 50 and 100). The fluid properties are similar to slickwater.

TABLE 1

Diverter and fracturing fluid properties

| Particles | Density | 950 kg/m³ |
|---|---|---|
| | Young's Modulus | 260 MPa |
| | Poisson's Ratio | 0.41 |
| Fluid | Density | 1010 kg/m³ |
| | Viscosity | 50 cp |

Figure 4A:
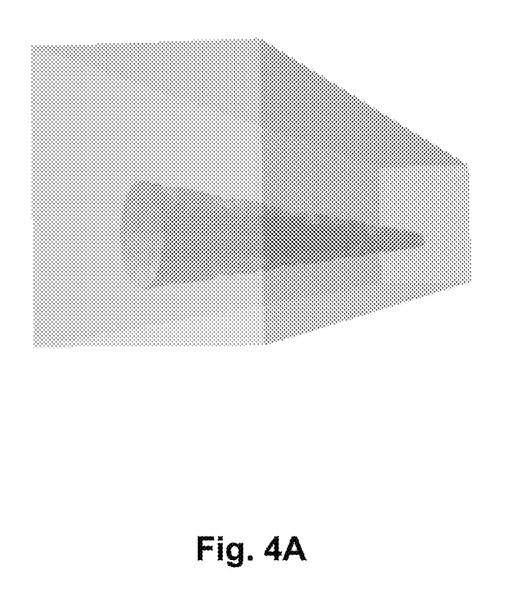
FIG. 4A provides an example of a single fracture used in the simulation and FIG. 4B provides an example of a fracture intercepting a natural fracture.
Figure 4B:
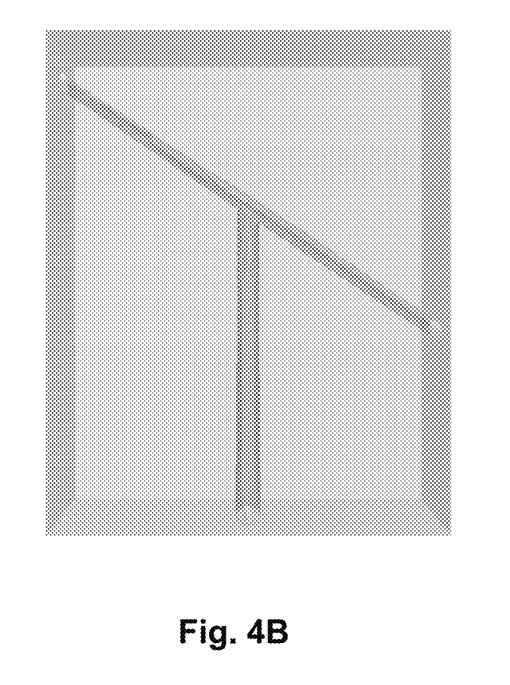

Two different types of fractures were modeled for the simulations, a single fracture (FIG. 4A) and a fracture intercepting a natural fracture (FIG. 4B). Three dimensional geometry is considered for fractures here to have a realistic model for particles motion and fluid flow. To reduce computational time, the length of the fractures modeled is small, in the order of 20 cm.

Results

Figure 5:
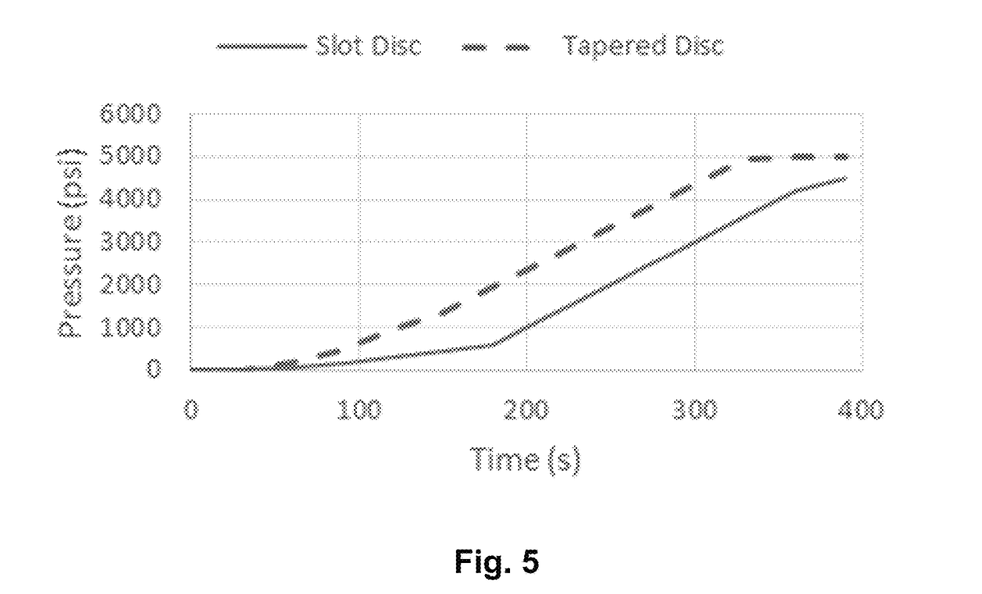
FIG. 5 plots pressure buildup for both a tapered disc and a slot disc at 80° C.
Figure 6A:
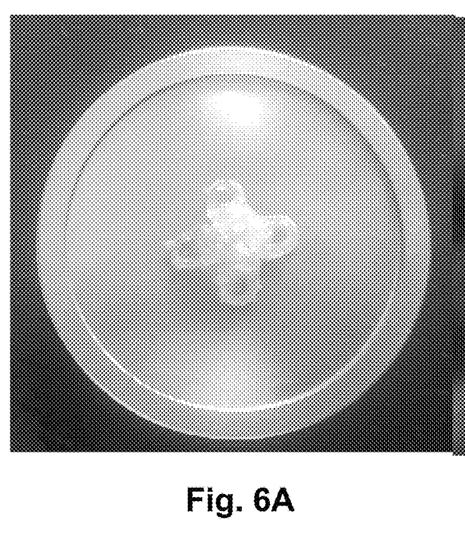
FIGS. 6A-B are examples of ridged diverters sealing the fracture in a slot disc and a tapered disc.
Figure 6B:
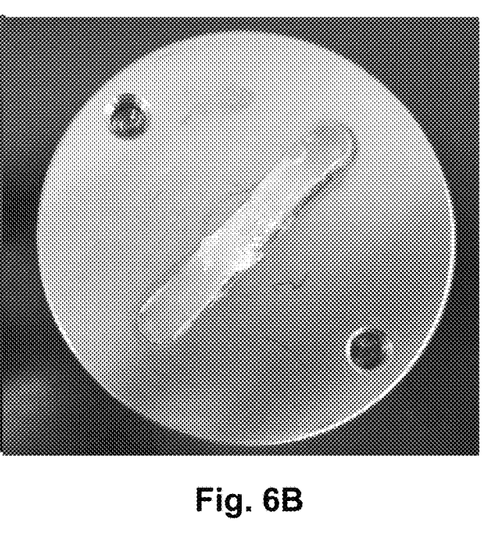

The experiments were carried out at 60, 70 and 80° C. At the last temperature the particles completely expanded and plugged the fracture. When the activation temperature was not reached, the diverters were not as effective and allowed leaking of a small amount of fluid. The plugging can be confirmed with the steep pressure buildup. The experiment started with no pressure. With the aid of a hydraulic pump and at a constant rate, the maximum pressure was reached in 5 minutes after the experiment started. The plugging was effective and was able to hold very high pressures. When the fracture width in the tapered disc was smaller, the plugging was faster (FIG. 5). The particles bridged the aperture and were concentrated near the inlet of the tapered disc (FIG. 6A). With the same concentration, a larger number of particles were required to seal the fracture in the slot disc (FIG. 6B).

Figure 8A:
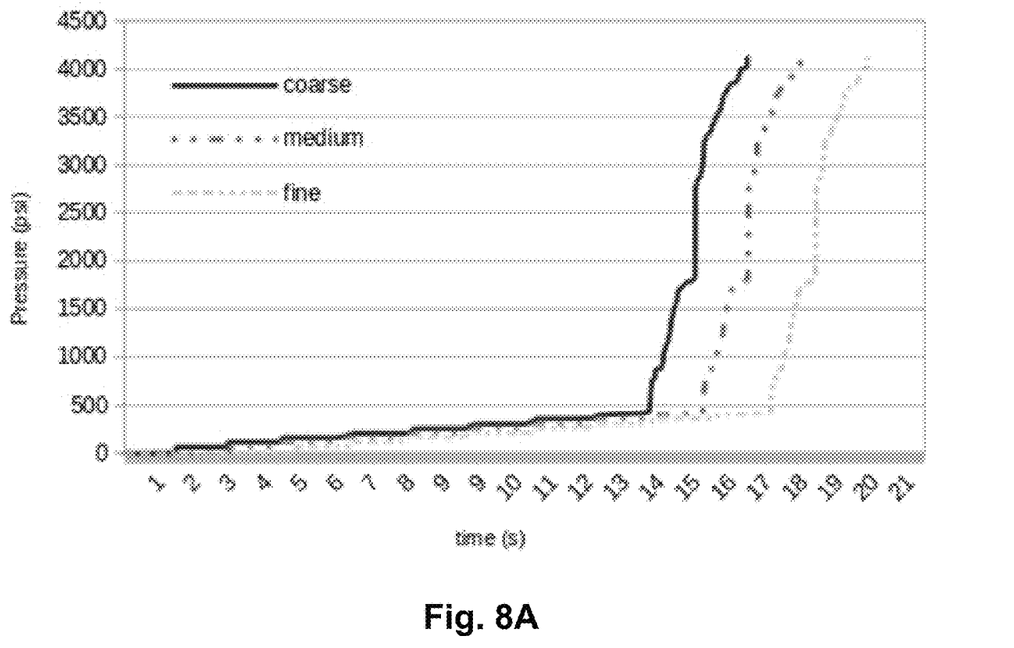
FIGS. 8A-B show pressure buildup with three different sizes of diverting particles, in the single fracture (FIG. 8A) and in the fracture intercepting a natural fracture (FIG. 8B).

The numerical results show good agreement with the experimental results, with the fracture effectively being clogged when the particles were placed and expanded. Once the particles settled, the pressure quickly increased (FIG. 8A). The natural fracture was also successfully plugged (FIG. 8B).

Figure 7:
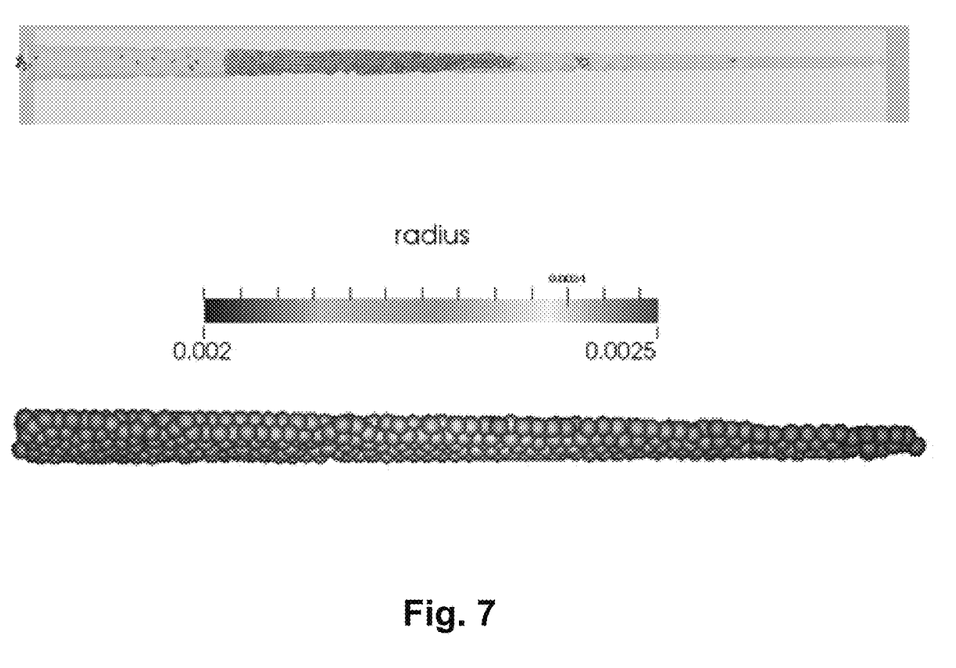
Figure 8B:
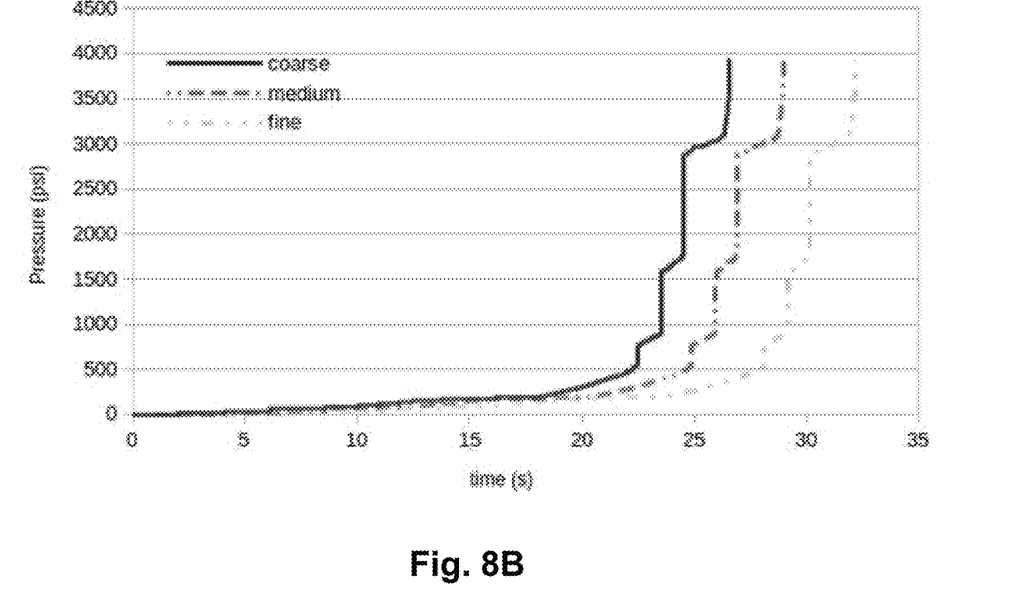

FIGS. 8A and 8B show the fluid pressure quickly increasing, which can be interpreted as the fracture being plugged. The first particles are fully expanded (FIG. 7), while the next ones are gradually expanding due to the contact with heat from the formation. This way they ensure proper plugging of the fracture. As observed, the time for coarser particles to plug the fracture was shorter. That is because the bridging occurred near the wellbore. Smaller particles were able to penetrate deeper, requiring more time to settle. In this case, they are ideal for far field diversion, where the diversion can create new branches of fractures far from the well. In the single fracture, the amount of time needed for coarse particles was 16 seconds, while for the fine ones, 20 seconds were needed. By increasing the complexity, the diverters also have more paths to follow. The choice of diverter size depends on the needs of the operations and previous information on the fracture sizes.

As expected, in all cases once the particle degrades, the pressure instantly drops with the fluid resuming its original flow.

CONCLUSION

Proper diversion of fracturing fluid is necessary to expand stimulated rock volume (SRV) and enhance production from a previously stimulated well. The described expandable diverter proved to effectively seal fractures in the laboratory, allowing the fracturing energy to be concentrated in creating new fractures and increase SRV. Data obtained from these experiments verified the bridging ability of the expandable diverter. The material expanded quickly when exposed to temperatures above the activation temperature and sealed the fracture. Depending on the fracture width and diverter particle size distributions, the observed sealing time would be different. The resultant seal can sustain up to 5000 psi net pressure during the treatment.

To have a better understanding of the effect of particle sizes and their performance for different fracture size and geometries, simulations were carried out in a coupled CFD-DEM model. This model can track the diverting particles individually and simulate the frac fluid flow within the fractures. Two fracture network geometries were modeled along with a range of diverter particle sizes. Numerical simulations demonstrated the transport, placement and expansion of the diverters, with the flow resuming when the particles degraded. The size of the fracture plays an important role, as seen in the above-mentioned examples, and can be evaluated before choosing the particles size and concentration.

REFERENCES

Allison, D. B., Curry, S. S., & Todd, B. L. (2011). Restimulation of Wells using Biodegradable Particulates as Temporary Diverting Agents. *Canadian Unconventional Resources Conference*, 1-11. http://doi.org/10.2118/149221-MS Arnold, D., Fragachan, F., & International, W. (2014). Eco-Friendly Degradable Mechanical Diverting Agents for Combining Multiple-Staged Vertical Wells: Case History from Wasatch Formation.

Asala, H. I., Ahmadi, M., & Taleghani, A. D. (2016). SPE-181516-MS Why Re-Fracturing Works and Under What Conditions, (September), 26-28.

Clason, C. E. (1936). Acid Treatment of Wells. U.S. Pat. No. 1,122,452.

Davis, N., Growcock, F., Calloni, G., Davidson, E., & Fluids, B. D. (2000). New Permeability Plugging Apparatus Procedure Addresses Safety and Technology. *Society of Petroleum Engineers*.

Glasbergen, G., Todd, B. L., Van Domelen, M. S., & Glover, M. D. (2013). Design and Field Testing of a Truly Novel Diverting Agent. *SPE Annual Technical Conference and Exhibition*, (1), 1-20. http://doi.org/10.2118/102606-MS Gomaa, A. M., Nino-penaloza, A., Mccartney, E., Mayor, J., & Hughes, B. (2016). Engineering Solid Particulate Diverter to Control Fracture Complexity: Experimental Study.

Gomaa, A. M., Sun, H., Nelson, S., Solvay, Q. Q., Boncan, G. V., & Hughes, B. (2015). Using Swelling Materials to Control Fracture Complexity: Experimental.

Harrison, N. W. (1972). Diverting Agents—History and Application. *Journal of Petroleum Technology*, 593-598.

Kloss, C., Goniva, C., Hager, A., Amberger, S., & Pirker, S. (2012). Models, algorithms and validation for opensource DEM and CFD-DEM. *Pcfd*, 12, 140-152. http://doi.org/10.1504/PCFD.2012.047457

Kalita, H., Mandal, M., Karak, N., (2012). Biodegradable solvent-induced shape-memory hyperbranched polyurethane. Journal of Polymer Research, 19, 9982-9986.

Lendlein, A., & Langerz, R. (2002). Biodegradable, Elastic Shape-Memory Polymers Applications. *Science*, 296(1), 1673-1676.

Li, G. (2014). Self-Healing Composites: Shape Memory Polymer Based Structures, John Wiley & Sons, Inc., West Sussex, UK.

Mansour, A., A. Dahi Taleghani, G. Li, 2017, Smart Expandable LCM Materials; A theoretical and Experimental Study, presented in AADE National Technical Conference and Exhibition held April 11-12 in Houston, Tex.

Santos, L., Dahi Taleghani, A., Li, G., 2016, Smart Expandable Proppants to Achieve Sustainable Hydraulic Fracturing Treatments, SPE-181391-MS, SPE Annual Technical Conference & Exhibition, 26 September-28 September, Dubai, UAE, doi:10.2118/181391-MS.

Taleghani, A. D., Li, G., & Moayeri, M. (2016). SPE-181384-MS The Use of Temperature-Triggered Polymers to Seal Cement Voids and Fractures in Wells.

Zhu, H. P., Zhou, Z. Y., Yang, R. Y., & Yu, a. B. (2007). Discrete particle simulation of particulate systems: Theoretical developments. *Chemical Engineering Science*, 62(13), 3378-3396. http://doi.org/10.1016/j.ces.2006.12.089

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

The invention claimed is:

1. A method for temporary fracture isolation comprising: providing a chemical diverter to a first fracture, wherein the chemical diverter is a shape memory polymer;

wherein the shape memory polymer has a starting state, a programmed state, and an activated state,
  wherein in the starting state the shape memory polymer has a starting state diameter,
  wherein the programmed state is achieved by heating the memory polymer in the starting state to a programming temperature under a first pressure and subsequently cooling the shape memory polymer prior to providing to the first fracture,
  wherein in the programmed state the shape memory polymer has a programmed state diameter,
  wherein in the activated state of the shape memory polymer has an activated state diameter,
  wherein the starting state diameter is about 20% to 70% greater than the programmed state diameter,
  wherein the activated state diameter is about 3% to 50% greater than the programmed state diameter,
  wherein the shape memory polymer in the programmed state will convert to the shape memory polymer in the activated state when an activation temperature of about 60° C. to about 180° C. is applied to the shape memory polymer in the programmed state;
causing, in a predetermined manner, the shape memory polymer to increase in dimension at a particular location in the first fracture;
plugging the first fracture with the shape memory polymer; and
applying pressure and fluid via a pump to the fracture to create at least one new fracture.

2. The method of claim 1, further comprising:
exposing the shape memory polymer in the programmed state to the activation temperature in the fracture; and
converting the shape memory polymer in the programmed state to the shape memory polymer in the activated state upon exposure to the activation temperature inside the fracture, wherein the diameter of the shape memory polymer in the activated state has a diameter that is greater than the diameter of the shape memory polymer in the programmed state, wherein the activated particles plug the fracture under pressures of up to about 5000 net psi.

3. The method of claim 1, wherein chemical dissolution, biodegradation, or both of the shape memory polymer occurs to reopen the first fracture.

4. The method of claim 3, wherein the chemical dissolution of the shape memory polymer occurs by the addition of a solvent comprising hydrofluoric acid, hydrochloric acid, ionic liquids, ethylene glycol, diethylene glycol, cyclohexanol, N-Methyl-2-pyrrolidone, bacteria, or a combination thereof.

5. The method of claim 1, wherein the chemical diverter comprises a thermosetting shape memory polymer, an ionomer, an ionic polymer, or a combination thereof.

6. The method of claim 5, wherein the thermosetting shape memory polymer is in the form of particles, and wherein the shape of the particles is selected from spheres, discs, fibers, or combinations thereof.

7. The method of claim 1, wherein the chemical diverter has a core surrounded by a thermosetting shape memory polymer, and wherein the core is selected from a group consisting of: sand, bauxite, and ceramic.

8. The method of claim 1, wherein the activation temperature is from about 70° C. to about 90° C.

9. The method of claim 1, wherein the activated state diameter is about 5% to 20% greater than the programmed state diameter.

10. A method for temporary fracture isolation comprising:
providing a shape memory polymer to a first fracture,
  wherein the shape memory polymer comprises a plurality of particle sizes;
  wherein the shape memory polymer has a starting state, a programmed state, and an activated state,
    wherein in the starting state the shape memory polymer has a starting state diameter,
    wherein the programmed state is achieved by heating the memory polymer in the starting state to a programming temperature under a first pressure and subsequently cooling the shape memory polymer prior to providing to the first fracture,
    wherein in the programmed state the shape memory polymer has a programmed state diameter,
    wherein in the activated state of the shape memory polymer has an activated state diameter,
    wherein the starting state diameter is about 20% to 70% greater than the programmed state diameter,
    wherein the activated state diameter is about 3% to 50% greater than the programmed state diameter,
    wherein the shape memory polymer in the programmed state will convert to the shape memory polymer in the activated state when an activation temperature of about 60° C. to about 180° C. is applied to the shape memory polymer in the programmed state;
causing, in a predetermined manner, the shape memory polymer to increase in dimension at a particular location in the first fracture;
plugging the first fracture with the shape memory polymer;
applying pressure and fluid via a pump to the fracture to create at least one new fracture; and
introducing a solvent to dissolve the shape memory polymer to reopen the first fracture.

11. The method of claim 10, wherein sizes of the plurality of particle sizes are selected based on the size of the first fracture.

12. The method of claim 10, further comprising:
exposing the shape memory polymer in the programmed state to the activation temperature in the first fracture; and
converting the shape memory polymer in the programmed state to the shape memory polymer in the activated state upon exposure to the activation temperature inside the first fracture, wherein the diameter of the shape memory polymer in the activated state has a diameter that is greater than the diameter of the shape memory polymer in the programmed state, wherein the activated particles plug the first fracture under pressures of up to about 5000 net psi.

13. The method of claim 10, wherein the chemical diverter comprises a thermoplastic shape memory polymer, an ionomer, an ionic polymer, or a combination thereof.

14. The method of claim 13, wherein the thermoplastic shape memory polymer is in the form of particles, and wherein the shape of the particles is selected from spheres, discs, fibers, or combinations thereof.

15. The method of claim 13, wherein the solvent is selected from hydrofluoric acid, hydrochloric acid, ionic liquids, ethylene glycol, diethylene glycol, cyclohexanol, N-Methyl-2-pyrrolidone, bacteria, or a combination thereof.

16. The method of claim 10, wherein the chemical diverter has a core surrounded by a thermoplastic shape memory polymer, and wherein the core is selected from a group consisting of: sand, bauxite, and ceramic.

17. The method of claim 10, wherein the activation temperature is from about 70° C. to about 90° C.

18. The method of claim 10, wherein the activated state diameter is about 5% to 20% greater than the programmed state diameter.

* * * * *